(12) United States Patent
Newman et al.

(10) Patent No.: US 6,895,775 B2
(45) Date of Patent: May 24, 2005

(54) APPARATUS FOR SURFACE CRUST FREEZING OF FOOD PRODUCT

(75) Inventors: Michael D. Newman, Hillsborough, NJ (US); Stephen A. McCormick, Warrington, PA (US); D. Scott Boyles, Telford, PA (US); Thomas Edward Kilburn, Pennsburg, PA (US)

(73) Assignee: The BOC Group, Inc., Murray Hill, NJ (US)

( * ) Notice: Subject to any disclaimer, the term of this patent is extended or adjusted under 35 U.S.C. 154(b) by 0 days.

(21) Appl. No.: 10/641,757

(22) Filed: Aug. 15, 2003

(65) Prior Publication Data

US 2004/0103672 A1 Jun. 3, 2004

Related U.S. Application Data

(60) Provisional application No. 60/404,069, filed on Aug. 16, 2002.

(51) Int. Cl.[7] .............................................. F25D 25/00
(52) U.S. Cl. .............................. 62/378; 62/63; 62/380; 62/381; 426/524
(58) Field of Search .......................... 62/62, 63, 337, 62/378, 380, 384, 440; 426/524

(56) References Cited

U.S. PATENT DOCUMENTS

| | | | |
|---|---|---|---|
| 3,494,140 A | * | 2/1970 | Harper et al. ............... 62/190 |
| 3,701,263 A | | 10/1972 | Barrett |
| 3,708,995 A | | 1/1973 | Berg |
| 3,757,533 A | | 9/1973 | Kent |
| 4,171,625 A | | 10/1979 | Morgan et al. |
| 4,356,707 A | | 11/1982 | Tyree, Jr. et al. |
| 4,479,776 A | | 10/1984 | Smith |
| 4,580,411 A | | 4/1986 | Orfitelli |
| 4,626,661 A | | 12/1986 | Henke |
| 4,783,972 A | | 11/1988 | Tyree, Jr. et al. |
| 4,803,851 A | | 2/1989 | Stokes |
| 4,866,946 A | | 9/1989 | Klee |
| 4,943,442 A | | 7/1990 | Schack et al. |
| 4,953,365 A | | 9/1990 | Lang et al. |
| 5,020,330 A | | 6/1991 | Rhoades et al. |
| 5,170,631 A | | 12/1992 | Lang et al. |
| 5,203,820 A | * | 4/1993 | Dibbs ......................... 62/381 |
| 5,218,826 A | | 6/1993 | Kirschner et al. |
| 5,220,803 A | | 6/1993 | Kiczek |
| 5,349,828 A | | 9/1994 | Lee et al. |
| 5,352,472 A | | 10/1994 | Lucke |
| 5,417,074 A | * | 5/1995 | McAfee et al. ................ 62/63 |
| 5,487,908 A | | 1/1996 | Appolonia et al. |
| 5,551,251 A | | 9/1996 | Ochs et al. |
| 5,606,861 A | | 3/1997 | Renz |
| 5,740,678 A | * | 4/1998 | Lee et al. ..................... 62/63 |
| 5,765,381 A | | 6/1998 | Renz |
| 5,787,716 A | * | 8/1998 | Allen, Jr. ..................... 62/63 |
| 5,836,166 A | * | 11/1998 | Wardle ........................ 62/63 |
| 5,878,582 A | | 3/1999 | Appolonia et al. |
| 6,151,913 A | | 11/2000 | Lewis et al. |
| 6,233,966 B1 | * | 5/2001 | Delpuech et al. ............ 62/374 |
| 6,263,680 B1 | | 7/2001 | Newman et al. |
| 6,318,112 B1 | | 11/2001 | Lennox, III |
| 6,334,330 B2 | | 1/2002 | Lang et al. |
| 6,434,950 B2 | | 8/2002 | Newman et al. |
| 6,622,513 B1 | * | 9/2003 | Howard ...................... 62/380 |
| 6,675,589 B1 | * | 1/2004 | Howard ........................ 62/63 |
| 2001/0013227 A1 | | 8/2001 | Lang et al. |
| 2001/0025495 A1 | | 10/2001 | Newman et al. |

* cited by examiner

Primary Examiner—Denise L. Esquivel
Assistant Examiner—Richard L. Leung
(74) Attorney, Agent, or Firm—Joshua L. Cohen

(57) ABSTRACT

An apparatus and method for surface crust freezing of a food product utilizes a refrigeration shell enclosing a freezing chamber, the freezing chamber having a cavity shaped to substantially accommodate the shape of the exterior surface of the food product; the cavity communicating with the refrigeration shell; a transport substrate to carry the food product into the freezing chamber; a cryogen supply; and a gas circulation device in the refrigeration shell in communication with the cryogen supply to introduce a cooling flow of gas containing cryogen into the cavity so as to contact the food product along its exterior surface.

15 Claims, 6 Drawing Sheets

APPARATUS FOR SURFACE CRUST FREEZING OF FOOD PRODUCT

CROSS REFERENCE TO RELATED APPLICATIONS

This application claims the benefit of the filing date of U.S. Provisional Application for Patent Ser. No. 60/404,069, filed Aug. 16, 2002.

FIELD OF THE INVENTION

The present invention relates to the slicing of ready to eat meat logs or chubs.

BACKGROUND

Ready-to-eat ("RTE") meat logs, or chubs, are rolls of processed meat which can be, for example, of a diameter from about 3 to about 6 inches, and up to about 72 inches in length. After the meat logs are processed, i.e., prepared, they must be sliced for market. In order to slice the meat logs in a cost effective manner, especially in consideration of the amount of material that must be sliced, it is necessary to cool and preferably freeze the surface layer of the meat log for proper and effective slicing. The cylindrical shape of the meat log makes them difficult to freeze in standard chilling tunnels and, in those situations where the crust is frozen unevenly, the slicing process is less effective and the cutting device becomes clogged with the meat material.

The market for ready-to-eat ("RTE") products offered in supermarkets is increasing, as is the need for cost-effective slicing processes.

An unfrozen meat log impacted by a slicing blade is cut less effectively and less accurately than would be the case when using a surface frozen meat log. Conventional meat log cutting apparatus, upon retraction of the blade for a subsequent cut, cause portions of the product to adhere to the blade, which portions are flung about the processing area, while some of the material is retained on the blade surface during the subsequent cut. This causes increased maintenance and repair of the blade and support for the machinery, and is a less effective processing of the meat log. In machines conducting 1000 slices a minute, this could translate into a 5–15 percent loss of product.

Typical meat log processing apparatus include the following:
1. Conveyer belts upon which the food product is conveyed to a chilling region, which chills only one side of the meat log.
2. A plurality of meat logs are loaded in bulk into a large cryogen freezer, and the cooling medium is circulated about the meat logs in order to cool them to where the meat logs are ready for slicing.

However, these known processes take from 15 minutes to 4 hours, depending upon the equipment installed and the consistency of the composition of the meat logs. These known apparatus and methods are not cost effective, are time consuming, and consume large amounts of floor space.

Other apparatus and methods of crust-freezing meat products in preparation for cutting or slicing operations are disclosed in U.S. Pat. No. 4,943,442, which is directed to a method and apparatus for forming a frozen crust on a preformed meat body by direct immersion of a pumped, meat stream in liquid nitrogen in a freezer, followed by downstream severing and patty formation; and in U.S. Pat. No. 5,352,472, which is directed to a method and apparatus for freezing the surface of loaf-shaped meat products by compressing the loaf against a refrigerated contact surface prior to slicing. These apparatus and methods involve direct contact with either a liquid or solid heat exchange medium.

It would therefore be desirable to have a high gas-flow cruster apparatus and method, which uniformly freezes the exterior surface crust of the meat log and also is adapted to conform to the shape of the meat log for effective and accurate processing thereof.

SUMMARY

An apparatus is provided for surface crust freezing of a food product comprising: a shell enclosing a freezing chamber, the freezing chamber having a cavity shaped to substantially accommodate a shape of the exterior surface of the food product; the cavity in communication with the shell; a transport substrate to carry the food product within the freezing chamber; a cryogen supply; and a gas circulation device in the shell in communication with the cryogen supply to introduce a cooling flow of gas containing cryogen into the cavity to contact the food product along its exterior surface.

In one embodiment in which the food product is cylindrical in shape, the freezing chamber comprises an impingement cylinder having openings substantially across its length for communicating the cooling flow from the gas circulation device into cooling impingement jets of cryogen directed perpendicular to the surface of the food product.

In another embodiment in which the food product is cylindrical in shape, the freezing chamber comprises a cylinder having an opening for communicating the cooling flow from the gas circulation device along the interior of the cavity parallel to the exterior and longitudinal axis of the food product.

In another embodiment, the freezing chamber includes at least one open mesh basket adapted to accommodate the shape of the food product, the basket is carried on a drive wheel through a substantially ovaloid (that is, circular or oval) impingement chamber within the shell, the impingement chamber having impingement holes about its circumference communicating with the shell exteriorly and the freezing chamber interiorly, the basket being adapted to rotate in relation to the drive wheel such that the entire exterior of the food product is exposed to the cooling flow from the gas circulation device into the cooling impingement jets of cryogen directed through the impingement holes from the exterior of the impingement chamber substantially perpendicular to the surface of the food product. The interior of the impingement chamber is in communication with the gas circulation device to recirculate gas and cryogen to the gas circulation device.

In yet another embodiment, the freezing chamber includes at least one open mesh basket adapted to accommodate the shape of the food product, the basket is carried on a drive wheel through an elongated, substantially ovaloid (that is, circular or oval) elongated shell within the shell, the elongated shell communicating with the shell exteriorly and the freezing chamber interiorly, the basket being adapted to rotate in relation to the drive wheel such that the entire exterior of the food product is exposed to the cooling flow from the gas circulation device along the interior of the elongated shell parallel to the exterior and longitudinal axis of the food product.

A method of surface crust freezing of a food product is provided comprising: transporting the food product into a freezing chamber having a cavity shaped to substantially accommodate the shape of the exterior surface of the food product; and, introducing a cooling flow of gas containing cryogen into the cavity so as to contact the food product along its exterior surface.

In one embodiment, the method includes communicating the cooling flow into cooling impingement jets of cryogen directed perpendicular to the surface of the food product.

In another embodiment, the method includes communicating the cooling flow along the interior of the cavity parallel to the exterior and longitudinal axis of the food product.

BRIEF DESCRIPTION OF THE DRAWINGS

The accompanying drawings are included to provide a further understanding of the invention and are incorporated in and constitute a part of this specification. The drawings illustrate embodiments of the invention, and, together with the description, serve to explain the principles of the invention, but are not intended to limit the invention as encompassed the claims of the application.

DETAILED DESCRIPTION

Figure 1:
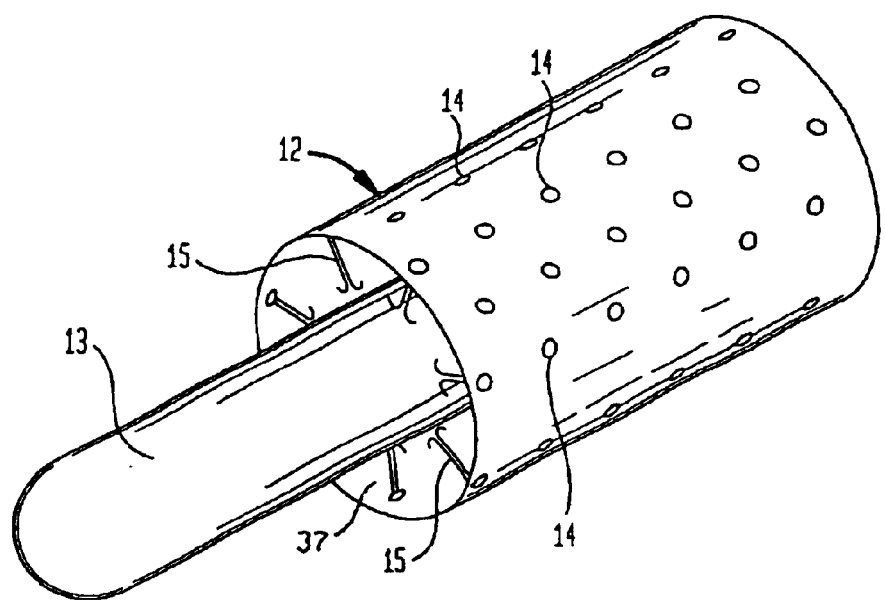
FIG. 1 is a perspective view of an RTE meat log inside a cylinder where impingement flow is employed.

The present apparatus and method provides for a uniform freezing ("crusting") of the meat log to a selected depth from the meat log surface, preferably ¼ inch, which crusting is uniform throughout the surface of the meat log, in order to overcome the disadvantages of known apparatus and methods. Freezing or crusting time for apparatus and process disclosed herein is about 1½ minutes to about 2 minutes.

The apparatus provides a cylindrically shaped freezing section that crusts a meat log product uniformly and much more efficiently than known chilling tunnels. In one embodiment, an impinging-type gas flow is employed which is directed uniformly along an exterior surface of the meat log, disposed within a cylindrically shaped chamber, so that the high velocity and perpendicular impingement heat transfer is effected along the entire surface of the meat log. In an alternative embodiment, a cross-flow gas flow is used, wherein the gas moves at high velocities parallel to a surface or longitudinal axis of the meat log. This embodiment produces comparable surface heat transfer coefficients to that of the impingement heat transfer embodiment.

Each of the embodiments described provides for a very cold surface crust (approximately ¼ inch deep) to be rapidly achieved by the meat log. Upon removal from the apparatus, the meat log can be sped to a high-speed slicer, wherein the crusting process permits a uniform, neat, and cost effective slicing operation.

As an example, one embodiment of the apparatus and process utilizes impingement type gas flow of cryogen, such as carbon dioxide or nitrogen gas, in a straight pass-through configuration. The meat log is loaded into one end of the apparatus, and is removed with a full frozen crust at the opposite end. A plurality of screw-type conveyors may be used to convey the product through the freezing apparatus and process. This method is effective for freezing round, cylindrical shaped meat logs. As a result of the conveying process, the meat log is rotated while it is frozen, eliminating the need for a moving impingement cylinder. Since meat logs are produced in a number of various cross-sectional shapes, other embodiments of the apparatus and process accommodate these shapes. The "cryogen" discussed in this Specification may include solid or liquid carbon dioxide or nitrogen, provided by a cryogen supply and mixed with the respective cryogenic gas to form a cooling gas flow.

In certain embodiments, the meat log is conveyed for crusting along a passage formed between a pair of dual hemispheres or impingement plates through which a cooling flow of a cryogen, such as carbon dioxide or nitrogen gas, is circulated to crust the meat log. In an alternative embodiment, the arrangement of the dual hemisphere impingement plates may be set off to the side, as opposed to being beneath the blower which circulates the cryogen. The conveyer in these embodiments may be a screw-type system, where the meat log has a circular cross-section. However, if the cross-section of the meat log is other than round, the conveyer may comprise belts. In yet another embodiment, the apparatus is inverted to facilitate cleaning beneath the apparatus, and between the apparatus and the underlying surface.

In alternative embodiments, the blower may be opposite the slot so that gas is drawn through the cylinder. That is, the blower may be positioned at an exit of the impingement cylinder and the slot at an entrance to the impingement cylinder.

In certain embodiments, a "rotary type" meat log crusting apparatus may be employed, again utilizing impingement type gas flow. The meat logs may be loaded and discharged at one port, for example by being placed in a stainless steel mesh basket, and being conveyed between two cylinders. One complete rotation will result in all surfaces of the product being frozen. Centrifugal fans mounted to the sidewall of the freezer provide the high-pressure cryogen gas to the impingement cylinders.

Another "rotary type" apparatus embodiment utilizes cross-flow type gas movement. The meat log is conveyed along a similar path as described above. However, without using impingement cylinders, the total space required for freezing is significantly reduced. As in the above embodiment, the meat logs are conveyed in mesh baskets and centrifugal fans provide the necessary gas flows. The cryogen gas is forced along the surface of the meat log and is circulated back into the fans, as the process continues.

Food freezing apparatus and methods are disclosed in U.S. Pat. Nos. 4,803,851; 6,263,680; and 6,434,950; and in U.S. Published patent application No. 2001/0025495, all assigned to The BOC Group. These patents and application are incorporated by reference herein, as if fully written below.

For a more complete understanding of the apparatus and process, reference may be had to FIGS. 1 to 11 shown in connection with the description of various the embodiments.

Figure 2:
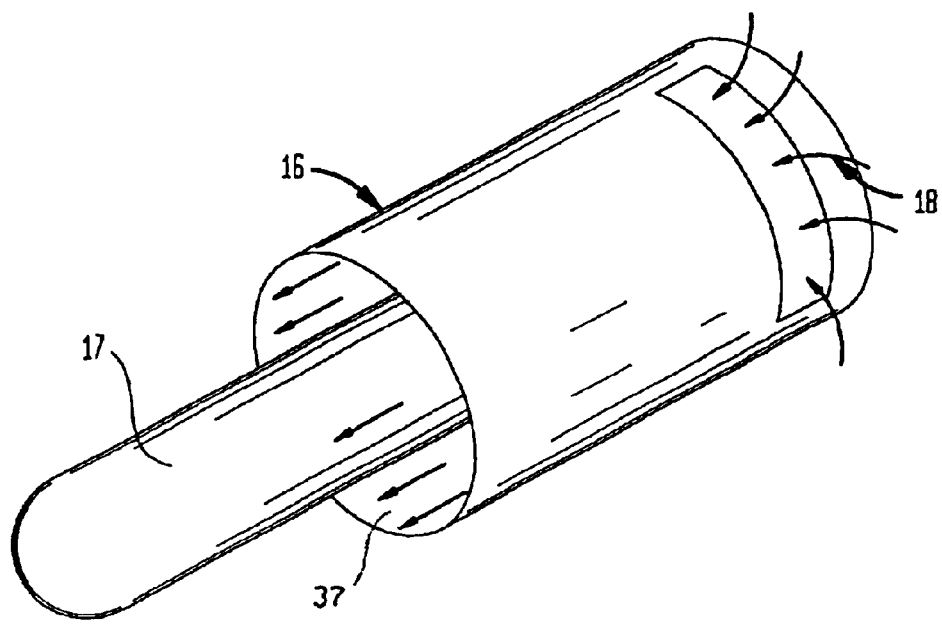
FIG. 2 is a perspective view of an RTE meat log inside a cylinder where cross flow is employed.

The flow patterns of the various embodiments of the cruster apparatus are generally described in FIGS. 1 and 2. The cylinders 12 and 16 are used for exemplary purposes to illustrate the flow patterns used to freeze the surface layers of the RTE meat logs in the various embodiments of the apparatus and process. In FIG. 1 the surface layer of an RTE meat log 13 is frozen to a specified depth with impingement flow of a cooling flow. For example, the cylinder 12 is provided with holes 14 up and down its length, and the holes 14 provide for communication between the interior cavity 37 and exterior of the cylinder 12. Therefore, when the cooling flow is directed toward the cylinder 12, it is focused by the holes 14 into various cooling jets 15. Inside the cylinder 12, the cooling jets 15 are perpendicular to the exterior of the RTE meat log 13. As the cooling jets 15 impinge the exterior of the RTE meat log 13, the cooling jets 15 absorb heat, and subsequently freeze the surface layer of the RTE meat log 13. The impingement flow as described hereinabove is used in the first, second, third, and fourth embodiments described hereinafter, to freeze the surface layer of the RTE meat logs.

In FIG. 2, the surface layer of an RTE meat log 17 is frozen to a specified depth with cross flow of a cooling flow 18. For example, the cylinder 16 is provided with a slot 19, and the slot 19 allows for communication between the interior cavity 37 and exterior of the cylinder 16. Therefore, when the cooling flow 18 is directed toward the cylinder 16, it enters the slot 19, and moves at a high velocity parallel to the exterior of and along the longitudinal axis of the RTE meat logs 17. As the cooling flow 18 is applied to the exterior of the RTE meat log 17, the cooling flow 18 absorbs heat, and subsequently freezes the surface layer of the RTE meat log 17. The cross flow as described hereinabove is used in the fifth embodiment of the apparatus and process to freeze the surface layer of the RTE meat logs.

Figure 3:
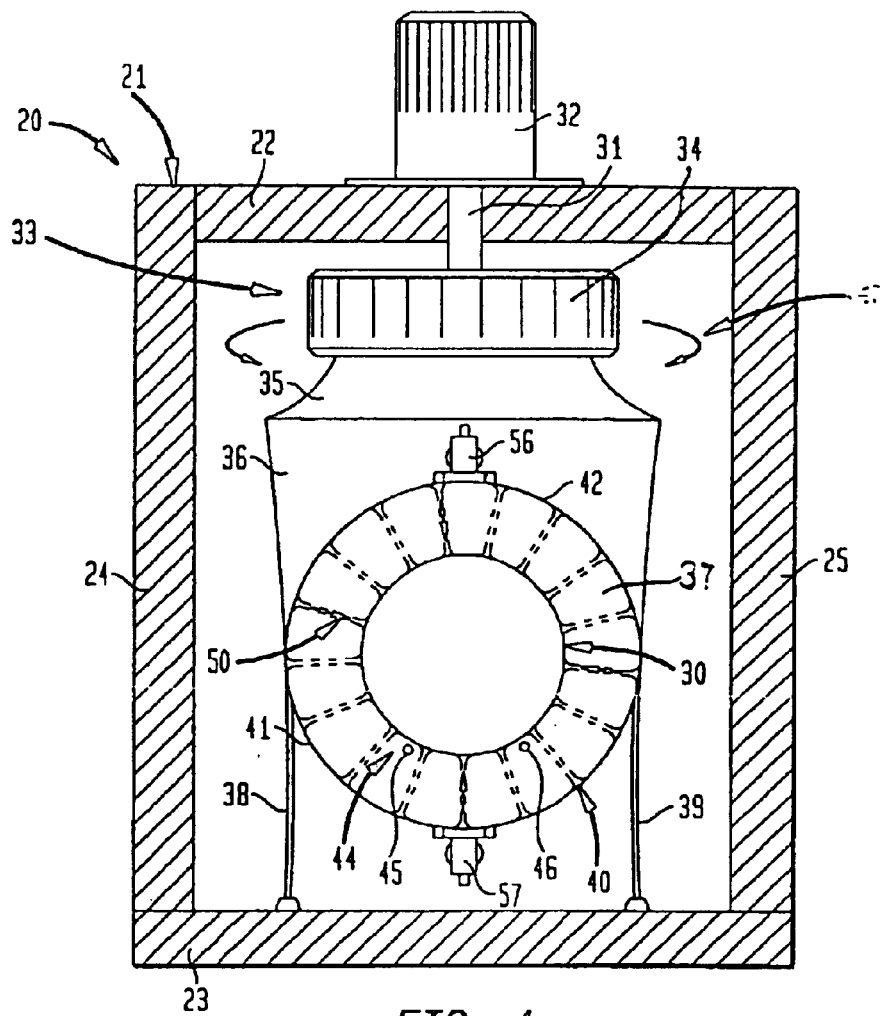
FIG. 3 is a cross-sectional view of one embodiment of the cruster apparatus.
Figure 4:
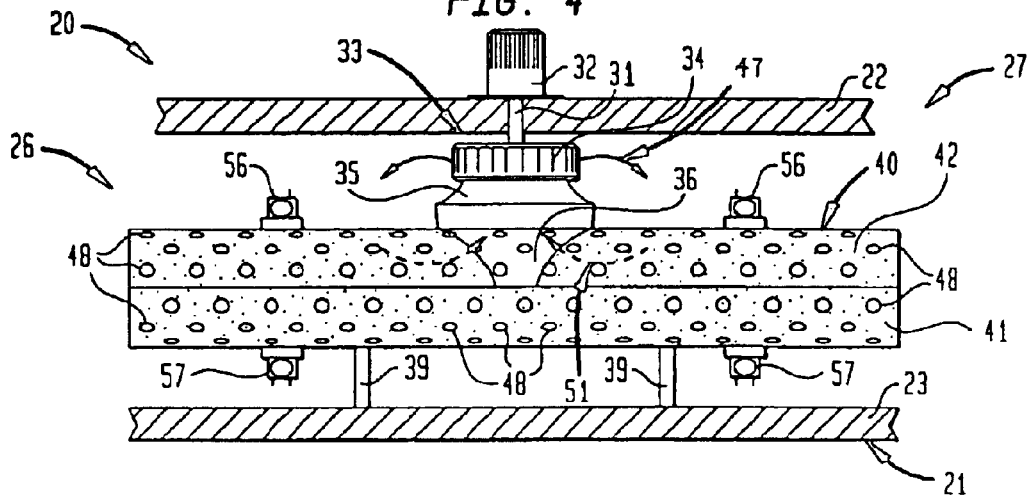
FIG. 4 is a cross-sectional view along the longitudinal length of the embodiment of FIG. 3 of the cruster apparatus.

As shown in FIGS. 3 and 4, the first embodiment of the cruster using impingement flow is generally indicated by the numeral 20. The impingement cruster 20 includes a refrigeration shell 21 having a ceiling 22, a floor 23, and side walls 24 and 25. The refrigeration shell 21 has an entrance 26 and exit 27, and functions as a tunnel freezer for freezing the surface layer of the RTE meat log 30.

Extending through the ceiling 22 is a motor shaft 31 attached to a motor 32. The motor 32 is located on the exterior surface of the ceiling 22, and is provided with an electrical supply (not shown). The motor 32 drives a blower assembly 33, and the blower assembly 33 includes an impeller 34 and a volute 35. The blower assembly 33 is attached to an impingement shell 40 using a shroud 36, and is used to circulate and re-circulate gas around the impingement shell 40.

The impingement shell 40 is formed from hemispherical impingement plates 41 and 42, and is supported in the interior of the refrigeration shell 21 using support legs 38 and 39. As shown in FIG. 3, the impingement shell 40 is cylindrically shaped to accommodate the cylindrical shape of the RTE meat log 30. That is, the hemispherical impingement plates 41 and 42 effectively envelop the cylindrical shape of the RTE meat log 30. However, the impingement shell 40 can be adapted to accommodate RTE meat logs having different shapes.

As shown in FIG. 4, the impingement shell 40 extends through the longitudinal length of the refrigeration shell 21. Furthermore, as shown in FIG. 3, a conveyer system 44 consisting of two rotating screws 45 and 46 is provided on the interior cavity 37 of the impingement shell 40. The rotating screws 45 and 46 support the RTE meat log 30 inside the impingement shell 40, and are used to convey the RTE meat log 30 along the longitudinal lengths of the refrigeration shell 21 and impingement shell 40. Furthermore, as the rotating screws 45 and 46 move the RTE meat log 30 through the impingement shell 40, the rotating screws 45 and 46 simultaneously rotate the RTE meat log 30.

The rotation of the RTE meat log 30 allows a cooling flow 47 supplied by the blower assembly 33 to be applied uniformly to the exterior of the RTE meat log 30. For example, the impingement shell 40 is provided with holes (or apertures) 48, and these holes 48 allow the cooling flow 47 to enter, and be spread throughout the interior cavity 37 of impingement shell 40.

The cooling jet pattern 50 created by cooling flow 47 inside the impingement shell 40 is shown in FIG. 3. Various cooling jets are formed as the cooling flow 47 passes through the holes 48. The cooling flow 47 may comprise a cryogenic gas ($CO$ or $N_2$), and the heat of the RTE meat log 30 is absorbed when the cooling flow 47 impinges the exterior of the RTE meat log 30. As such, the uniform application of the cooling jet pattern 50 to the exterior of the RTE meat log 30 uniformly freezes the surface layer of the RTE meat log 30 to a selected depth. In practice, the RTE meat log 30 is loaded onto the conveyer system 44 and into the impingement shell 40 at the entrance 26 of the refrigeration shell 21, and is subsequently removed from the exit 27 with a frozen surface layer.

After the cooling jet pattern 50 is applied to the exterior of the RTE meat log 30, the reflected gas flow 51 is drawn by the impeller 34 into the blower assembly 33, and is subsequently re-circulated. For example, the impeller draws the reflected gas flow 51 into the shroud 36. The shroud 36 communicates with the interior cavity 37 of the impingement shell 40, and encloses an opening therein. After entering the shroud 36, the impeller 34 draws the reflected gas flow 51 through the volute 35. The volute 35 acts as the entrance to the impeller 34. After entering the impeller 34, the reflected gas flow 51 is mixed with the above-discussed cryogen, and subsequently re-circulated as the cooling flow 47.

Attached to the exterior of the impingement shell 40 are vibrators 56 and 57. The vibrators 56 and 57 can be pneumatically or mechanically actuated, and are used to prevent snow and ice from building up inside the holes provided in the impingement shell 40. The frequency and time intervals of the vibrations provided by the vibrators 56 and 57 are dependent on the process conditions, including the moisture content of the RTE meat log 30, the humidity of the ambient air in and outside the refrigeration shell 21, and the temperature on the interior of the refrigeration shell 21.

Figure 5:
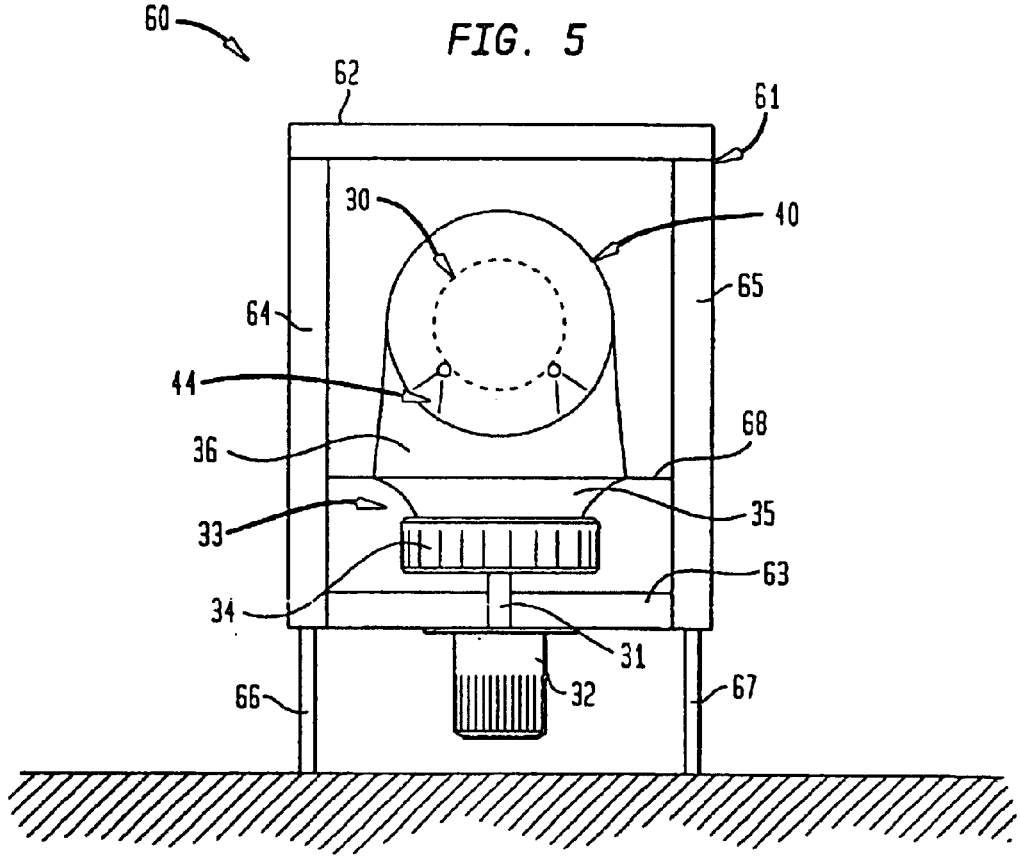
FIG. 5 is a cross-sectional view of another embodiment of the cruster apparatus.

As shown in FIG. 5, the second embodiment of the cruster apparatus using impingement flow is generally indicated by the numeral 60. The impingement cruster 60 includes a refrigeration shell 61 having a ceiling 62, a floor 63, and side walls 64 and 65. Like refrigeration shell 21, the refrigeration shell 61 functions as a tunnel freezer for freezing the surface layer of an RTE meat log 30 is frozen. However, unlike the refrigeration shell 21, the motor shaft 31 extends through the floor 63. The motor shaft 31 is attached to a motor 32, and the motor 32 is located on the exterior surface of the floor 63. As such, the legs 66 and 67 support the refrigeration shell 61, and provided clearance for the motor 32.

Like the impingement cruster 20, the motor 32 in the impingement cruster 60 drives the blower assembly 33, and the blower assembly 33 is used to circulate and re-circulate gas around the impingement shell 40. However, in the impingement cruster 60 and refrigeration shell 61, the blower assembly 33 is inverted. For example, a support plate 68 is provided inside the refrigeration shell 61. The support plate 68 extends between the side walls 64 and 65, and carries the support legs (not shown) supporting the impingement shell 40. Consequently, the volute 35 is provided below the support plate 68, the shroud 36 is provided above the support plate 68, and a opening (not shown) in the support plate allows the volute 35 and shroud 36 to communicate.

Other than the different configuration, the impingement cruster 60 operates like the impingement cruster 20. That is, as the RTE meat log 30 is conveyed and rotated by the conveyer system, the cooling flow supplied by the blower assembly 33 enters the impingement shell 40, and a cooling jet pattern is applied uniformly to the exterior of the RTE meat log 30. The uniform application of the cooling jet pattern to the exterior of the RTE meat log 30 uniformly freezes the surface layer of the RTE meat log 30 to a selected depth. After the cooling jet pattern impinges the exterior of the RTE meat log 30, the reflected gas flow is drawn by the impeller 34 through the shroud 36 into the volute 25, and is subsequently re-circulated by the blower assembly 33.

Figure 6:
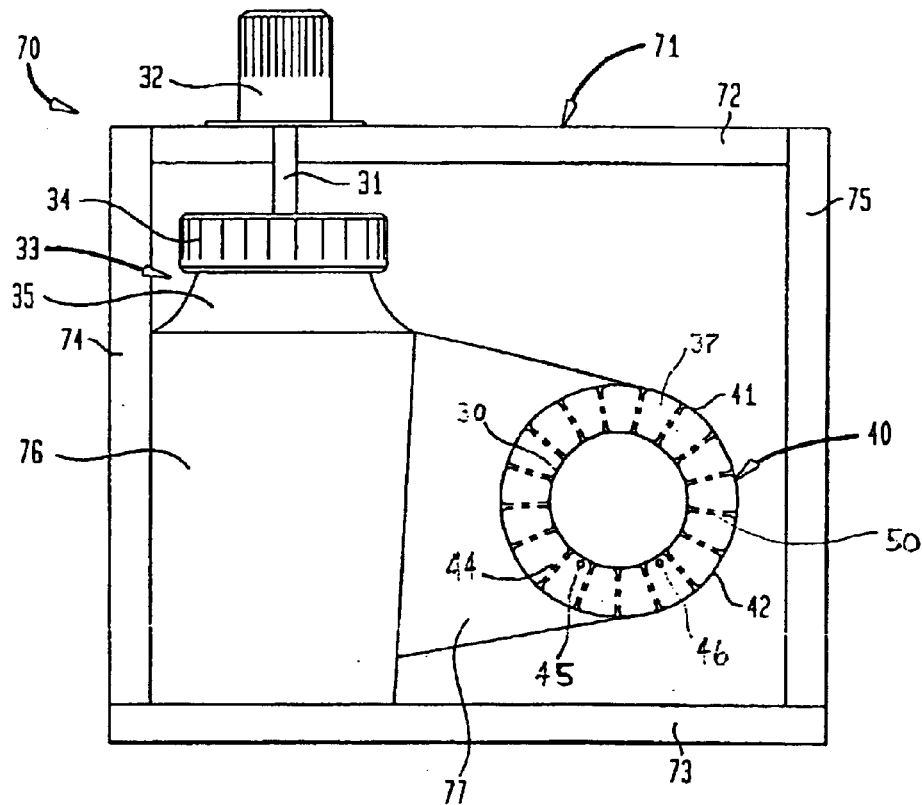
FIG. 6 is a cross-sectional view of a further embodiment of the cruster apparatus.
Figure 7:
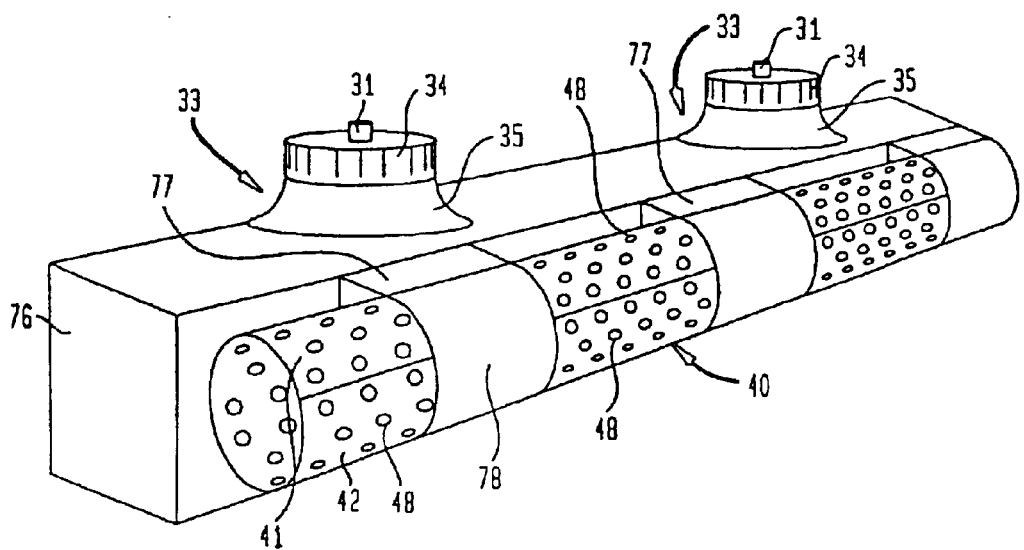
FIG. 7 is a perspective view of the embodiment of FIG. 6 of the cruster apparatus.

As shown in FIGS. 6 and 7, the third embodiment of the cruster apparatus using impingement flow is generally indicated by the numeral 70. The impingement cruster 70 includes a refrigeration shell 71 having a ceiling 72, a floor 73, and side walls 74 and 75. Like refrigeration shells 21 and 61, the refrigeration shell 71 functions as a tunnel freezer for freezing the surface layer of an RTE meat log 30. Furthermore, like the refrigeration shell 21, but unlike the refrigeration shell 61, the motor shaft 31 extends through the ceiling 72. The motor shaft 31 is attached to a motor 32, and the motor 32 is located on the exterior surface of the ceiling 72.

Like the impingement crusters 20 and 60, the motor 32 in the impingement cruster 70 drives the blower assembly 33, and the blower assembly 33 is used to circulate and re-circulate gas around the impingement shell 40. However, in the impingement cruster 70 and refrigeration shell 71, a low pressure plenum 76 and shroud 77 are used. For example, the impingement shell 40 is attached to the low pressure plenum 76 using brackets 78. The shroud 77 provides for communication between the interior cavity 37 of the impingement shell 40 and the low pressure plenum 76.

When operating, the cooling flow supplied by the blower assembly 33 enters the impingement shell 40 through holes 48 to create cooling jet pattern 50. The uniform application of the cooling jet pattern 50 the exterior of the RTE meat log 30 uniformly freezes the surface layer of the RTE meat log 30 to a selected depth. Furthermore, after the cooling jet pattern 50 is applied to the exterior of the RTE meat log 30, the reflected gas flow is drawn by the impeller 34 into the lower pressure plenum 76 through the shroud 77, and is subsequently re-circulated by the blower assembly 33.

Figure 8:
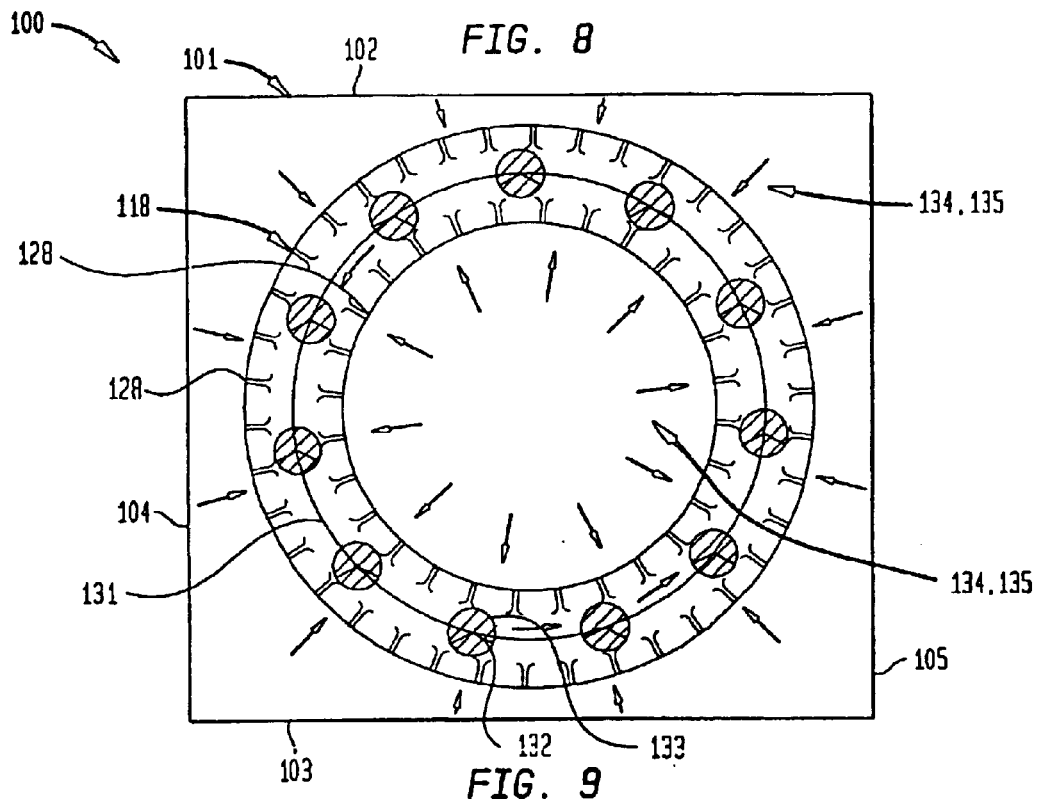
FIG. 8 is a cross-sectional view of another embodiment of the cruster apparatus.
Figure 9:
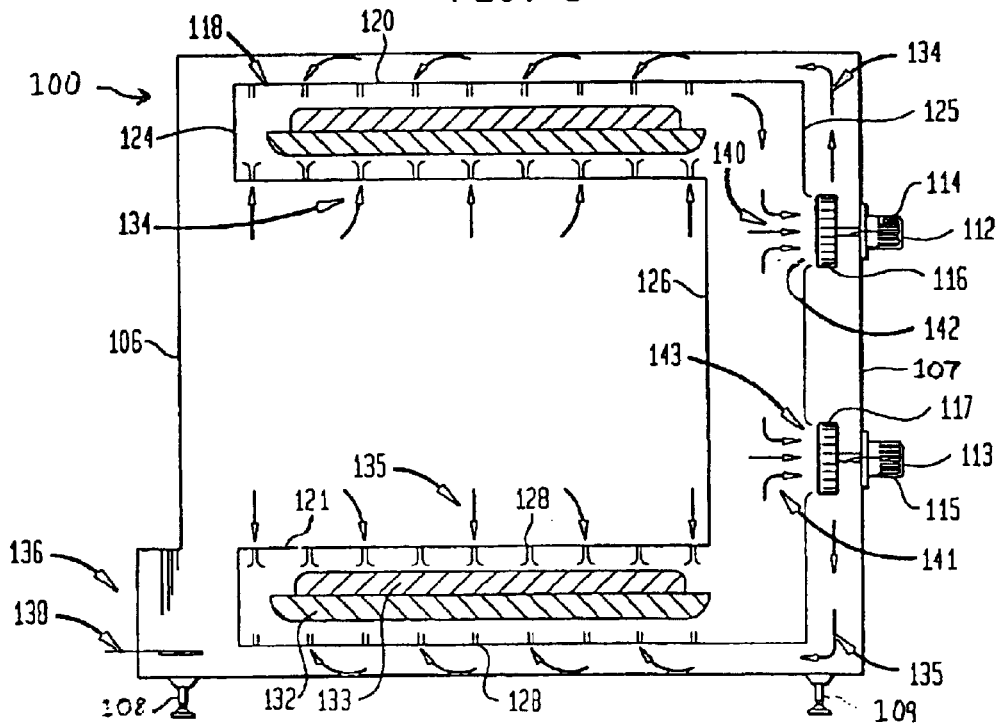
FIG. 9 is a cross-sectional view along the longitudinal length of the embodiment of FIG. 8 of the cruster apparatus.

As shown in FIGS. 8 and 9, the fourth embodiment of the cruster apparatus using impingement flow is generally indicated by the numeral 100. The impingement cruster 100 includes a cube-shaped refrigeration shell 101 having a ceiling 102, a floor 103 and side walls 104, 105, 106 and 107. The impingement cruster 100 is supported by pedestals 108 and 109 attached to the exterior surface of the floor 103.

Extending through the side wall 107 are motor shafts 112 and 113 attached to motors 114 and 115. The motors 114 and 115 are located on the exterior surface of the side wall 107, and are provided with an electrical supply (not shown). The motors 114 and 115 are used to rotate blowers 116 and 117 attached to the motor shafts 112 and 113. As will be discussed hereinbelow, the blowers 116 and 117 are used to circulate and re-circulate gas around the interior of the refrigeration shell 101.

Supported on the interior of the refrigeration shell 101 is a cup-shaped impinger 118. The cup-shaped impinger 118 is partially formed from concentric impingement cylinders 120 and 121. As shown in FIG. 9, the impingement cylinder 120 has a larger diameter than impingement cylinder 121. Furthermore, the impingement cylinder 120 also has a longer length than the impingement cylinder 121.

To form the cup shape of the cup-shaped impinger 118, the space between the impingement cylinders 120 and 121 is enclosed using a ring-shaped plate 124, and circular-shaped plates 125 and 126. For example, the ring-shaped plate 124 is joined to the diameters of the impingement cylinders 120 and 121, and encloses one end of the cup-shaped impinger 118. Furthermore, to enclose the other end of the cup-impinger 118, the circular-shaped plate 125 is joined around the circumference of the impingement cylinder 120 and the circular-shaped plate 126 is joined around the circumference of the impingement cylinder 121. As such, the impingement cylinders 120 and 121, along with the ring-shaped plate 124 and the circular plates 125 and 126 form the cup-shaped impinger 118. Like the above-referenced impingement shell 40, the cup-shaped impinger 118 is provided with holes 128. The holes 128 extend through the impingement cylinders 120 and 121, and allow for communication between the interior of the refrigeration shell 101 and the interior of the impinger 118.

Supported on the interior of the cup-shaped impinger 118 is a drive wheel 131. The drive wheel 131 supports a plurality of conveying baskets 132 at various positions around the circumference of the cup-shaped impinger 118. The conveying baskets 132 are hinged to the drive wheel 131, and, like the baskets of a ferris wheel, the orientation of the conveying baskets 132 adjusts with respect to the drive wheel 131 as the drive wheel 131 rotates. The conveying baskets 132 are composed of wire mesh, and, as shown in FIG. 9, extend through the interior of the cup-shaped impinger 118.

Carried by each of the conveying baskets 132 are RTE meat logs 133. The individual conveying baskets 132 are adapted to accommodate the shape of the RTE meat logs 133. Consequently, as the drive wheel 131 rotates, the conveying baskets 132 and RTE meat logs 133 are rotated within the interior of the cup-shaped impinger 131. As will be discussed hereinbelow, the rotation of the drive wheel allows the surface layer of the RTE meat logs 133 to be frozen.

As the drive wheel rotates inside the cup-shaped impinger 118, cooling flows 134 and 135 are provided by the blowers 116 and 117. The cooling flows 134 and 135 circulate around the interior of the refrigeration shell 101 and the exterior of the cup-shaped impinger 118, and ultimately enter the interior of the cup-shaped impinger 118 through holes 128. As the cooling flows 134 and 135 enter the holes 128 various cooling jets (not shown) are formed. The cooling jets ultimately impinge the exterior of the RTE meat log 133. The cooling flows 134 and 135 consist of a cryogenic gas (CO or $N_2$), and the heat from the RTE meat logs 133 is absorbed when cooling jets formed from the cooling flows 134 and 135 are applied to the exterior of the RTE meat logs 133.

An inlet 136 and an outlet (not shown) are provided near the bottom of the refrigeration shell 101, and a conveyer system 138 extends therethrough. The inlet 136 allows RTE meat logs 133 to be loaded and the outlet allows RTE meat logs 133 to be unloaded via the conveyer system 138 into the conveying baskets 132. As such, the conveying system effectively allows the individual RTE meat logs 133 to be loaded and subsequently unloaded from the conveying baskets 132 as the drive wheel 131 rotates between various positions.

In practice, each of the RTE meat logs 133 is loaded into the conveyor baskets 132 via the conveyor system 138 at the inlet 136. The rotation of the drive wheel 131, enables each of the RTE meat logs 133 to complete at least one rotation around the interior of the cup-shaped impinger 118. During the rotation of the RTE logs 133 around the interior of the cup-shaped impinger 118, the uniform application of the cooling flows 134 and 135 to the exterior of the RTE meat logs 133 uniformly freezes the surface layer of the RTE meat logs 133 to a selected depth. After at least one rotation around the interior of the cup-shaped impinger 118, each of the RTE meat logs 133 is unloaded from the conveying baskets 132 at the outlet.

As described hereinabove, the cooling jets formed from the cooling flows 134 and 135 freeze the surface layer of the RTE meat logs 133. However, after the cooling jets impinge the exterior of the RTE meat logs 133, the reflected gas flows 140 and 141 are drawn from the interior of the cup-shaped impinger 118 through the holes 142 and 143 and into the blowers 116 and 117. The holes 142 and 143 are provided in the circular-shaped plate 125, and allow the reflected gas flows 140 and 141 to enter the blowers 116 and 117 to be re-circulated as cooling flows 134 and 135.

Figure 10:
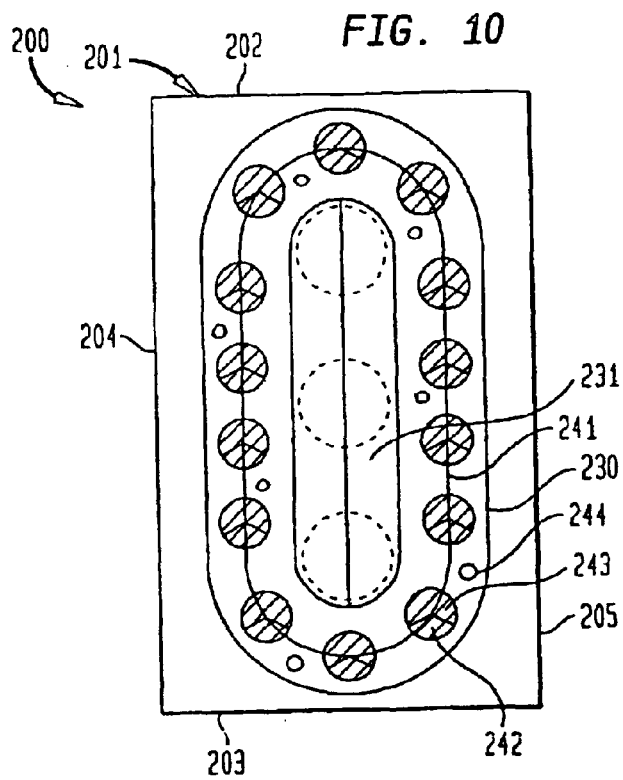
FIG. 10 is a cross-sectional view of yet another embodiment of the cruster apparatus.
Figure 11:
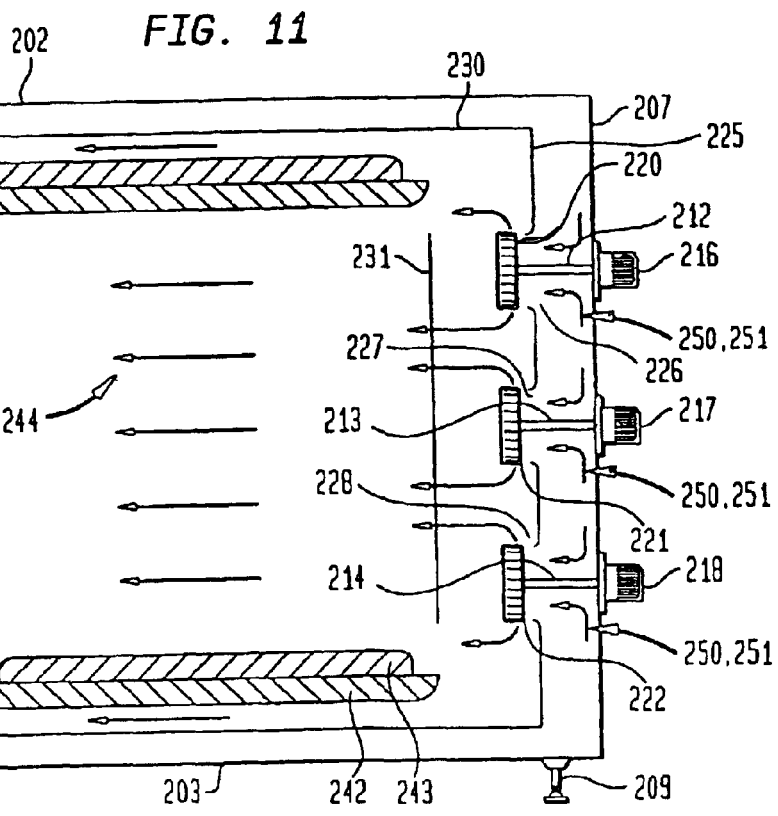
FIG. 11 is a cross-sectional view along the longitudinal length of the embodiment of FIG. 10 of the cruster apparatus.

As shown in FIGS. 10 and 11, the fifth embodiment of the cruster apparatus using cross flow is generally indicated by the numeral 200. The cruster 200 includes a box-shaped refrigeration shell 201 having a ceiling 202, a floor 203 and side walls 204, 205, 206 and 207. The cruster 200 is supported by pedestals 208 and 209 attached to exterior surface of the floor 203.

Extending through the side wall 207 are motor shafts 212, 213, and 214 attached to motors 216, 217, and 218. The motors 216, 217, and 218 are located on the exterior surface of the side wall 207, and are provided with an electrical supply (not shown). The motors 216, 217, and 218 are used to rotate blowers 220, 221, and 222 attached to the motor shafts 212, 213, and 214. As will be discussed hereinbelow, the blowers 220, 221, and 222 are used to circulate and re-circulate gas around the interior of the refrigeration shell 101.

Supported on the interior of the refrigeration shell 201 is an oval-shaped plate 225 with holes 226, 227, and 228. Extending from the perimeter of the oval-shaped plate 225 is an elongated shell 230 having an oval cross-section. Furthermore, provided adjacent the blowers 220, 221, and 222 is an oval-shaped baffle 231.

Supported on the interior of the refrigeration shell 201 is a drive wheel 241. The drive wheel 241 supports a plurality of conveying baskets 242 at various positions. The conveying baskets 242 are hinged to the drive wheel 241, and, like the baskets of a ferris wheel, the orientation of the conveying baskets 242 adjusts with respect to the drive wheel 241 as the drive wheel 241 rotates. The conveying baskets 242 are composed of wire mesh, and, as shown in FIGS. 10 and 11, are encapsulated inside the elongated shell 230 along with the drive wheel 241.

Carried by each of the conveying baskets 242 are RTE meat logs 243. The individual conveying baskets 242 are adapted to accommodate the shape of the RTE meat logs 243. Like the conveying baskets 132, the conveying baskets 242 are composed of wire mesh. As will be discussed hereinbelow, as the drive wheel 241 rotates, the conveying baskets 132 and RTE meat logs 243 are rotated within the interior of the elongated shell 230, and the rotation of the drive wheel 241 allows the surface layer of the RTE meat logs 243 to be frozen.

As the drive wheel rotates inside the elongated shell 230, a cooling flow 244 is provided by the blowers 220, 221, and 222. The cooling flow 244 circulates around the inside of the elongated shell 230. For example, the oval-shaped baffle 231 causes the cooling flow 244 to be directed outwardly from the blowers 220, 221, and 222 toward the conveying baskets 242 and RTE meat logs 243. However, the elongated shell 230 captures the cooling flow 244, and ensures that the cooling flow is adequately applied to the RTE meat logs 243. The cooling flow 244 is a cross flow which moves at a high velocity parallel to the exterior along the longitudinal axis of the RTE meat logs 243. As shown in FIG. 10, parts of the cooling flow 244 are disposed adjacent the conveying baskets 242 and RTE meat logs 243. The cooling flow 244 consists of a cryogenic gas (CO or $N_2$), and the heat from the RTE meat logs 243 is absorbed when the cooling flow 244 is applied to the exterior of the RTE meat logs 243. Overall, the heat transfer coefficients of the cooling flow 244 is comparable to the heat transfer coefficients of the cooling jets formed from the cooling flows 134 and 135 when using impingement flow.

An inlet 246 and an outlet (not shown) are provided near the bottom of the refrigeration shell 201, and a conveyer system 248 extends therethrough. The inlet 246 allows RTE meat logs 243 to be loaded and the outlet allows RTE meat logs 243 to be unloaded via the conveyer system 248 into the conveying baskets 242. As such, the conveying system effectively allows the individual RTE meat logs 243 to be loaded and subsequently unloaded from the conveying baskets 242 as the drive wheel rotates between various positions.

In practice, each of the RTE meat logs 243 are loaded into the conveyor baskets 242 via the conveyor system 248 at the inlet 246. The rotation of the drive wheel 241, enables each of the RTE meat logs 243 complete at least one rotation around the inside of the elongated shell 230. During the rotation of the RTE logs 243 around the inside of the elongated shell 230, the uniform application of the cooling flow 244 to the exterior of the RTE meat logs 243 uniformly freezes the surface layer of the RTE meat logs 243 to a selected depth. After at least one rotation around the inside of the elongated shell 230, each of the RTE meat logs 243 are unloaded from the conveying baskets 242 at the outlet.

As described hereinabove, the cooling flow 244 freezes the surface layer of the RTE meat logs 243. However, after the cooling flow 244 is applied to the exterior of the RTE meat logs 243, the remaining gas flows 250 and 251 flow around the outside of the elongated shell 230 and into the blowers 220, 221, and 222. The holes 226, 227, and 228 allow the remaining gas flows 250 and 251 to pass into the blowers 220, 221, and 222, and be re-circulated as cooling flow 244.

Each of the embodiments of the cruster apparatus act to rapidly freeze the surface layer of the RTE meat logs to approximately 0.25 inch deep. Upon removal from the various embodiments, the RTE meat logs can be transferred to a cutting blade to be sliced. The frozen surface layer of the RTE meat logs allows for a uniform, neat, and cost-effective slicing operation as described hereinabove.

All dimensions and parameters discussed with respect to all the embodiments are by way of example and not limitation. It will be appreciated that other sizes and shapes of the apparatus and its component parts may be employed. Although the invention has been described in detail through the above detailed description and the preceding examples, these examples are for the purpose of illustration only and it is understood that variations and modifications can be made by one skilled in the art without departing from the spirit and the scope of the invention. It should be understood that the embodiments described above are not only in the alternative, but can be combined.

We claim:

1. An apparatus for surface crust freezing of a food product comprising:
 a shell enclosing a freezing chamber, the freezing chamber having a cavity shaped to substantially accommodate a shape of the exterior surface of the food product; the cavity in communication with the refrigeration shell;
 a transport substrate to carry the food product within the freezing chamber;
 a cryogen supply;
 a gas circulation device in the shell and in communication with the cryogen supply to introduce a cooling flow of gas containing cryogen into the cavity to contact the food product along its exterior surface;
 wherein the freezing chamber comprises an impingement cylinder having openings substantially across its length for communicating the cooling flow from the gas circulation device into cooling impingement jets of cryogen directed perpendicular to the surface of the food product uniformly along the exterior surface of the food product.

2. The apparatus as in claim 1, wherein the transport substrate is a screw conveyor adapted to additionally rotate the food product.

3. The apparatus as in claim 1, wherein the transport substrate is a belt.

4. The apparatus as in claim 1, wherein the freezing chamber is disposed substantially below the gas circulation device.

5. The apparatus as in claim 1, wherein the freezing chamber is disposed substantially above the gas circulation device.

6. The apparatus of claim 1, further comprising a shroud in communication with the cavity of the freezing chamber and the gas circulation device to recirculate gas and cryogen to the gas circulation device.

7. The apparatus as in claim 1, wherein the impingement cylinder comprises a pair of hemispheres.

8. The apparatus as in claim 1, wherein at least one vibrator contacts the impingement cylinder, the at least one vibrator capable of being actuated to prevent snow and ice buildup in the openings.

9. An apparatus for surface crust freezing of a food product comprising:
 a shell enclosing a freezing chamber, the freezing chamber having a cavity shaped to substantially accommodate a shape of the exterior surface of the food product; the cavity in communication with the refrigeration shell;
 a transport substrate to carry the food product within the freezing chamber;
 a cryogen supply;
 a gas circulation device in the shell and in communication with the cryogen supply to introduce a cooling flow of gas containing cryogen into the cavity to contact the food product along its exterior surface,
 wherein the freezing chamber includes at least one open mesh basket adapted to accommodate the shape of the food product, the basket carried on a drive wheel through a substantially ovaloid impingement chamber within the shell, the impingement chamber having impingement holes about its circumference communicating with the shell exteriorly and the freezing chamber interiorly, the basket being adapted to rotate in relation to the drive wheel such that the entire exterior of the food product is exposed to the cooling flow from the gas circulation device into the cooling impingement jets of cryogen directed through the impingement holes from the exterior of the impingement chamber substantially perpendicular to the surface of the food product.

10. The apparatus as in claim 9, wherein an interior of the impingement chamber is in communication with the gas circulation device to recirculate gas and cryogen to the gas circulation device.

11. The apparatus as in claim 9, wherein the freezing chamber comprises the interior of concentric impingement cylinders having openings substantially across its length for communicating the cooling flow from the gas circulation device into cooling impingement jets of cryogen directed perpendicular to the surface of the food product.

12. An apparatus for surface crust freezing of a food product comprising:
 a shell enclosing a freezing chamber, the freezing chamber having a cavity shaped to substantially accommodate a shape of the exterior surface of the food product; the cavity in communication with the refrigeration shell;
 a transport substrate to carry the food product within the freezing chamber;
 a cryogen supply;
 a gas circulation device in the shell and in communication with the cryogen supply to introduce a cooling flow of gas containing cryogen into the cavity to contact the food product along its exterior surface, wherein the freezing chamber includes at least one open mesh basket adapted to accommodate the shape of the food product, the basket carried on a drive wheel through an elongated, substantially ovaloid elongated shell within the shell, the elongated shell communicating with the shell exteriorly and the freezing chamber interiorly, the basket being adapted to rotate in relation to the drive wheel such that the entire exterior of the food product is exposed to the cooling flow from the gas circulation device along the interior of the elongated shell parallel to the exterior and longitudinal axis of the food product.

13. An apparatus as in claim 12, wherein the freezing chamber comprises the interior of the elongated shell for applying the cooling flow from the gas circulation device along the interior of the cavity parallel to the exterior and longitudinal axis of the food product.

14. The apparatus as in claim 13, further comprising a plate supported on the interior of the shell, the plate having holes in communication with the exterior of the elongated shell and the gas circulation device to recirculate gas to the gas circulation device.

15. The apparatus as in claim 14 wherein a baffle directs the cooling flow to the elongated shell from the gas circulation device.

* * * * *